INVENTOR.

INVENTOR.
Isaac Goodbar
Tyson Avery Price

June 28, 1966  I. GOODBAR ETAL  3,257,900
PROJECTION SCREEN

Filed Oct. 25, 1963  6 Sheets-Sheet 5

INVENTOR.

United States Patent Office 3,257,900
Patented June 28, 1966

3,257,900
PROJECTION SCREEN
Isaac Goodbar, 93—02 211th St., and Edison Avery Price, 17 King St., both of New York, N.Y.
Filed Oct. 25, 1963, Ser. No. 318,848
18 Claims. (Cl. 88—28.9)

The present invention relates to a new projection screen which permits performances with illuminated surroundings.

The screen in accordance with the invention can be used for any type of projection, such as moving pictures, slides, opaque pictures or television. In all cases it offers the important advantage of permitting exhibitions anywhere, even in the open air during the day, for which purpose ordinary projectors can be used, the projector, the screen and the space between them all being in the open.

The screen object of the present invention consists of a large number of elements of size equal to or smaller than the minimum detail to be seen in the projected image.

Each of these elements is composed of a "receiving surface" and a "specular surface." These two surfaces are optically related, as will be explained, in such a way that the specular surface reflects all the light that it receives from the projector (except for unavoidable losses) into the receiving surface, magnifies this receiving surface, as seen by the viewing public, and reflects the environment brightness away from the viewing public.

Since these surfaces are identical throughout the screen, i.e., they are independent of the particular location, they can be made of molded plastic vacuum metalized, of aluminum injection molded or by other known methods of producing a repetitive pattern, such as, for instance, glass mosaics.

Furthermore, as it will be explained, the apparent brightness of any point of the projected image will be almost constant when viewed from any direction within the solid angle where the public is located.

Screens in accordance with the present invention can be made for front or rear projection or for both, i.e. the spectators may be located in the same side of the screen where the projector is located, on the opposite side or on both sides. In this last case, the public on both sides of the screen may watch the same picture or simultaneously a different picture on each side.

The present invention furthermore envisages other objects which will be made apparent in the course of the present description.

In order that the invention may be clearly understood and readily put into practice, some preferred embodiments thereof have been shown by way of example in the accompanying drawings in which FIG. 1 is a diagrammatic view of part of the screen with particular attention to the space in front of any point P.

FIGS. 1, 2 and 3 show part of a front projection screen 1 object of the present invention with one element P of the same, constructed as will be described later in this specification.

The whole space in front of P can be divided into two zones, one of them *inside* and the other *outside* the solid angle PABDC, limited by the vertical planes ACP and PBD containing P and forming the angle $h$ with the line $p$—$p$ and by the planes ABP and CDP intersecting on a horizontal line containing P and forming the angle $v$ with the line $p$—$p$. The line $p$—$p$ may or may not be perpendicular to the screen surface.

These angles $h$ and $v$ can be readily determined from plan, elevational or sectional drawings, so as to include the viewing public and the projectors and exclude as much of the environment as possible.

The construction of the element P is such, as will be described later in this specification, that all the light reaching it from any of the two special zones abovementioned, is reflected back only into the same zone. If the *inside* zone is such as to contain all the spectators then if a projector is located anywhere within this zone its total luminous output will be reflected only within this zone, i.e., the screen elements P will redirect the luminous flux that otherwise would be spread throughout the entire hemisphere and concentrate it into the zone where the spectators may be located. The apparent brightness of the image will, therefore, be increased several times.

Besides the brightness of the projected image, magnified as explained, the spectators will see a fraction of the brightness of their own zone superimposed. This brightness will be, in general, relatively low and will not detract very much from the projected image contrast. The zones of high brightness in general will be located in the *outside zone* and will not be reflected towards the spectators.

To simplify the explanation of the construction of the elements P, a screen with vertical control only will be considered first, i.e., a screen in which the lateral angles $h$ are equal to 90 degrees.

Figure 4:
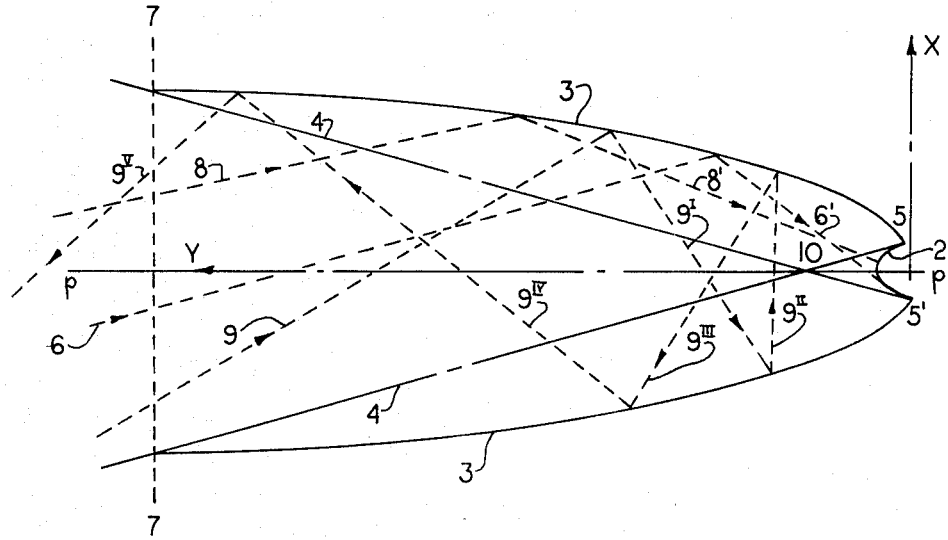
FIG. 4 represents schematically in large scale one possible construction of an element of screen object of the present invention.

In such a screen a vertical section of one element by means of a plane containing the line $p$—$p$ may look as is shown in FIG. 4.

Referring to FIG. 4, the surface 2 may be a specular or matte white surface of high reflectivity and of any shape. The horizontal tangents to this surface 2 will define in space a cylinder, with a vertical directrix (such as shown in FIG. 4) and horizontal generatrices (tangent to the surface 2). In the case of FIG. 4, for simplicity, the surface 2 has been assumed a cylinder.

The directrix 2 (or intersection of the abovementioned cylinder with the plane of FIG. 4) will be defined, in a system of coordinates $x$, $y$, as shown, in the plane of FIG. 4, by means of an equation:

$$y = f(x) \qquad (1)$$

If the surface 2 is defined as above then the specular surface 3 is defined by the following equations:

$$X = x + \frac{E - s - x \sin v + y \cos v}{\sin v - y' \cos v + \sqrt{1 + y'^2}} \quad (2)$$

$$Y = y + \frac{E - s - x \sin v + y \cos v}{\sin v - y' \cos v + \sqrt{1 + y'^2}} \quad (3)$$

where $x$ and $y$ are the coordinates of any point of 2, $X$ and $Y$ are the coordinates of points of 3, $y'$ is the derivative of $y$ with reference to $x$ $$s = \int_0^x \sqrt{1 + y'^2}\, dx \quad (4)$$

i.e., the length of the intersection $y = f(x)$ from $x = 0$ to $x$, and $E$ is a constant.

The surfaces 3 which in general are not a prolongation of each other are continued until they intersect the tangents 4 to the surface 2 forming the desired angle $v$, as shown in FIG. 4. In general the constant $E$ is chosen so as to make the curves 2 and 3 intersect at the points of tangency 5 of the tangents 4 inclined at the desired angle $v$. If $x_5$ and $y_5$ are the coordinates of these points of tangency, then:

$$E = s_5 + x_5 \sin v - y_5 \cos v \quad (5)$$

where $$s = \int_0^{x_5} \sqrt{1 + y'^2}\, dx \quad (6)$$

It is possible to prove mathematically (U.S. Patent 3,098,612) that any ray such as 6, inclined at an angle $v$ and reaching the opening 7—7 of the element will reach the surface 3 and will be reflected as an extreme ray tangentially to the surface 2. Any ray reaching 7—7 and inclined less than $v$, such as 8, must therefore reach 2 either directly or after one or more reflections. Also, any ray leaving the surface 2 will either exit through 7—7 at an angle equal to or smaller than $v$ either directly or after no more than one reflection on surface 3. Conversely, any rays reaching 7—7 and inclined at angles larger than $v$, such as 9, will not reach 2 either directly or after any number of reflections, but will be eventually reflected out again at angles larger than $v$.

If 2 is a surface of revolution and the angle $v$ is constant in all directions, then 3 will also be a surface of revolution, defined by Equations 2 and 3.

If 2 is part of a circular cylinder, with horizontal axis perpendicular to the figure, as shown in FIG. 4, the surfaces 3 are defined by the following equations:

$$X = x + \tfrac{1}{2} \sec^2 \tfrac{1}{2}(t - c)[E + t + \sin(t - c)] R \sin t \quad (7)$$

$$Y = y - \tfrac{1}{2} \sec^2 \tfrac{1}{2}(t - c)[E + t + \sin(t - c)] R \cos t \quad (8)$$

which are obtained by replacing in (2) and (3) the equation of the circle:

$$y = \sqrt{R^2 - x^2} \quad (9)$$

its derivative:

$$y' = -\cot t \quad (10)$$

where $$t = \tan^{-1}\left(\frac{y}{x}\right) \quad (11)$$

and the value $$s = \int_0^x \sqrt{1 + y'^2}\, dx = \int_{\frac{\pi}{2}}^t \operatorname{cosec} t\, d\cos t = \tfrac{1}{2}\pi - t \quad (12)$$

If the surface 2 is made flat or concave (any concave element must be replaced by a straight segment joining its extremes) the extreme rays are no longer tangents to 2 but become straight lines passing through one of the ends 5 or 5' and the Equations 2 and 3 reduce to those of parabolas each of which contains one of the ends 5, has a focus at the opposite end 5' of 2 (FIG. 6) and has an axis inclined at the angle $v$. Due to the well known property of the parabola, it will be obvious that any ray from the focus 5' will be reflected by 3 at an inclination $v$ (parallel to the axis). Any ray leaving from any point between 5 and 5' will leave at an angle smaller than $v$ either directly or after no more than one reflection on 3.

Figure 6:
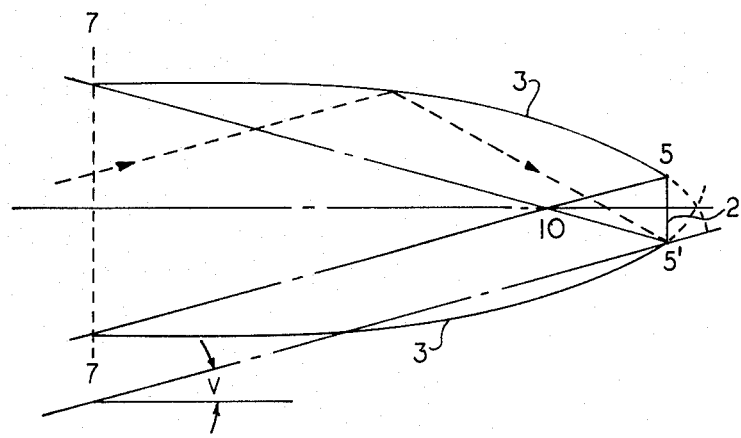
FIGS. 5 and 6 represent other possible constructions.
Figure 5:
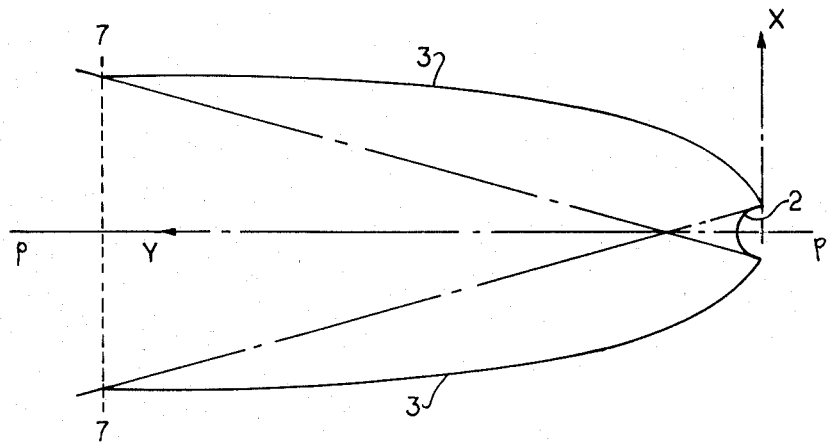

In short, the elements of FIGS. 4, 5 and 6 divide the space in two zones: one inside the dihedron 7–10–7 and one outside the same dihedron. The light from any of these zones is always reflected back into the same zone and never into the other zone. Except for losses due to unavoidable absorption at surfaces 2 and 3, no light is lost.

Elements controlling the light only vertically, such as those of FIGS. 4, 5 and 6, restrict the light that would otherwise be spread through a whole hemisphere (or 180° dihedron) into a smaller dihedron $2v$. The gain in brightness due to this would be $\operatorname{cosec} v$ if materials with 100 percent reflection factor were available. In practice, the gain is not so high but is enough to permit projections with substantial environment lighting or, in darkness, with substantially less projection power.

When looking at an element such as represented in FIGS. 4, 5 and 6 from within the limiting dihedron, the whole element appears filled with the surface 2 seen directly or after no more than one reflection. The brightness of the element, therefore, appears almost constant regardless of the spectator's position (within the *inside* zone). The opening 7—7 of each element must be equal to or smaller than the minimum detail that the projected image must show.

Figure 7:
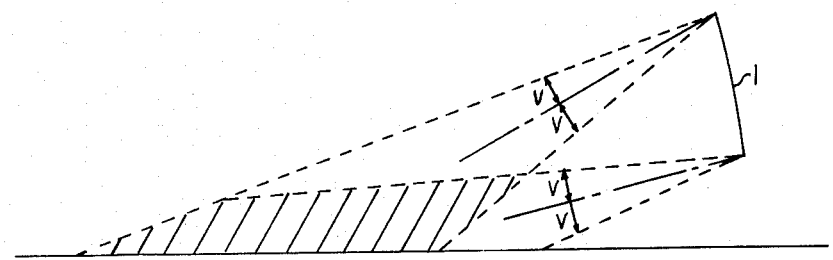
FIG. 7 represents a vertical section of a front projection screen composed of elements such as illustrated in FIGS. 4, 5 or 6.

FIG. 7 shows schematically, in elevation, a screen composed of elements as shown in FIGS. 4, 5 or 6. The screen may be flat or may have some slight curvature as shown. The shaded zone shows the acceptable locations of the public or the projectors.

Figure 8:
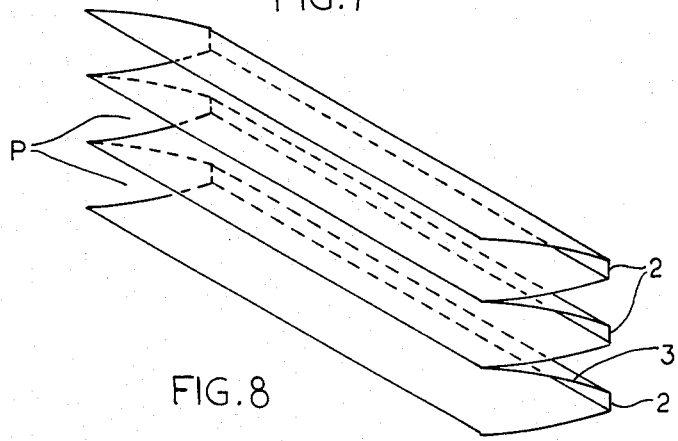
FIG. 8 represents in larger scale a front projection screen with elements as illustrated in FIG. 6.

A small portion of the projection screen shown in FIG. 7 is shown, highly magnified in FIG. 8. It is assumed that the construction of FIG. 6 has been adopted. The elements P in this case extend through the whole width of the screen.

Figure 9:
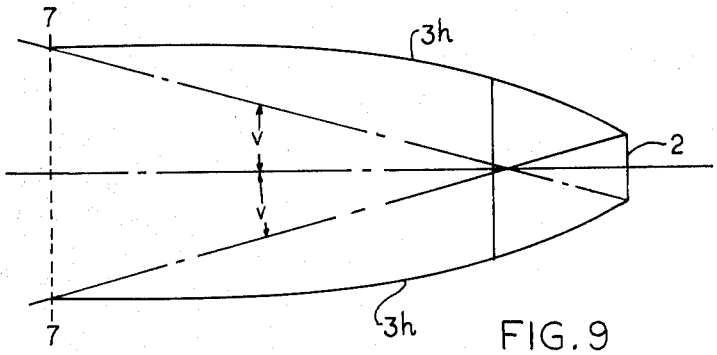
FIGS. 9 and 10 represent in elevation and in plan respectively an element of a projection screen in accordance with the present invention, with both vertical and horizontal control.
Figure 10:
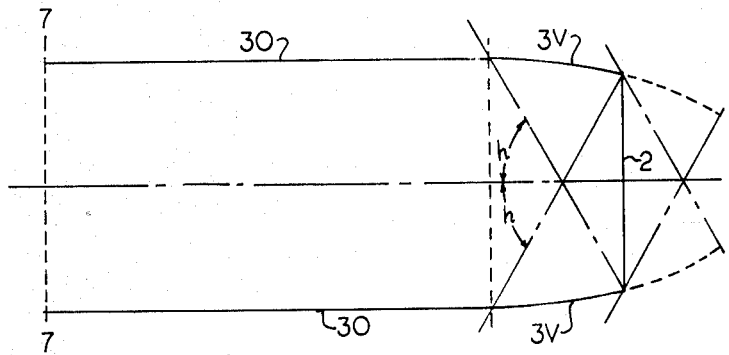
Figure 11:
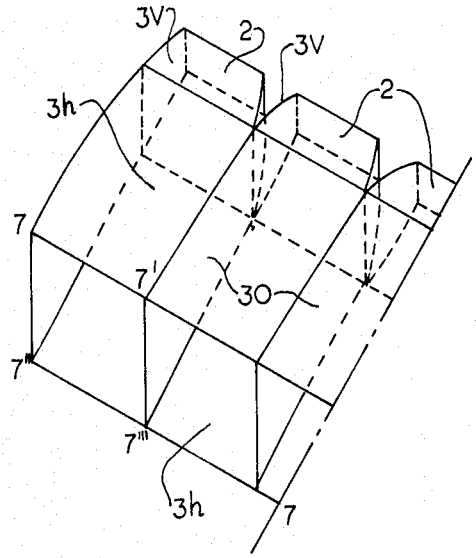
FIG. 11 represents in large scale a small part of such a screen.

As previously explained, in many cases it may be desirable to control the brightness distribution not only vertically, but also horizontally. In such a case, besides the surfaces 3 running horizontally, there will be others running vertically and constructed similarly except that the angles of horizontal control $h$ will, in general, be different than the ones of vertical control $v$. Since the spectators, in most cases, are spread horizontally more than vertically, $h$ will generally be larger than $v$. For this reason, in general, the elements 3 running horizontally will be larger than those running vertically, as shown in FIGS. 9 and 10 (elevation and plan). Since it is desirable that the distance 7—7 (minimum detail visible) should be the same horizontally as it is vertically, the elements 2 if flat will be in most cases rectangles with their large dimension horizontal.

It can be noticed that the elements $3v$ are prolonged by means of the flat specular reflectors 30 until they intersect the plane 7—7. This may be required in cases where the dimensions 7–7' is not negligible in comparison with the minimum detail of the projected image. Without these prolongations 30 an observer looking from the side would see on $3h$ not only reflections of the element 2 behind it but also reflections from other neighboring elements 2.

The prolongations 30 will assure that only reflections of the element 2 behind each cell 7–7'–7''–7''' are seen through any cell when viewed from anywhere within the *inside* zone.

Similar elements may be added to screens such as the one represented in FIG. 8 even when no lateral control is provided.

If 2 were convex surfaces, the vertical surfaces 3 would be obtained by means of Equations 2 and 3 with the values of $v$ replaced by those of $h$.

Figure 1:
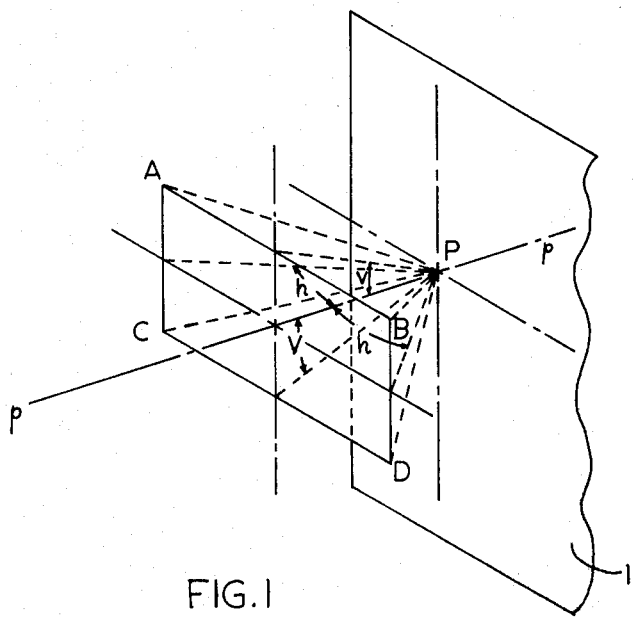
Figure 2:
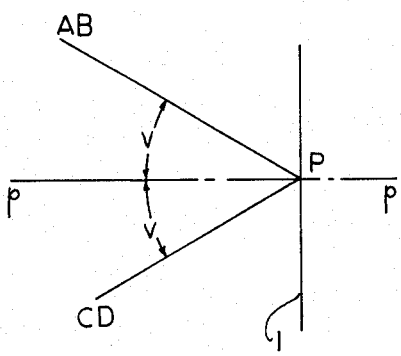
FIG. 2 is a sectional view taken through a vertical plane containing the line $p$—$p$ of FIG. 1.
Figure 3:
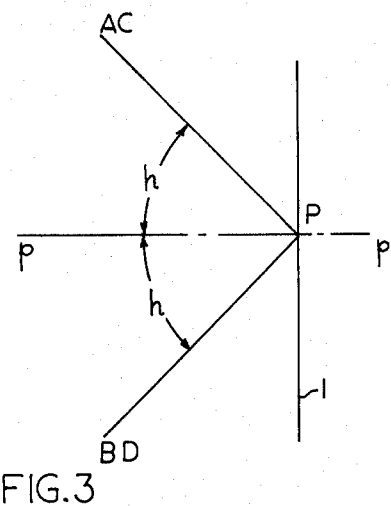
FIG. 3 is a sectional view taken through a horizontal plane containing the line $p$—$p$ of FIG. 1.

Though it was said previously that the line $p—p$ of FIGS. 1, 2 and 3 need not be perpendicular to the screen surface, most of the elements P shown so far were symmetrical. This, of course, will not be the case when the angles $v$ are not the same in both directions.

Figure 12:
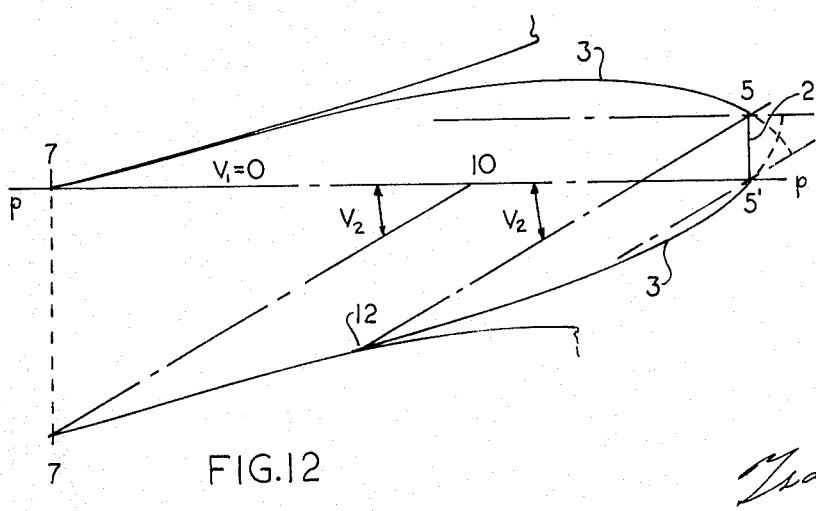
FIG. 12 represents an asymmetrical element of a screen, also in accordance with the present invention.
Figure 13:
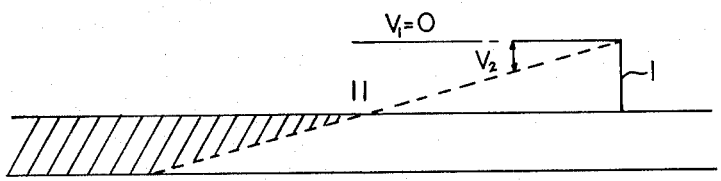
FIG. 13 represents a screen, with elements as represented in FIG. 11 and showing the location of the public.

FIG. 12 shows an element for vertical control with a flat vertical receiving surface 2, in which the angles $v$ are different upwards and downwards ($v_1$ upwards is 0 degrees, $v_2$ downwards is 30 degrees in FIG. 12). The specular surfaces 3 are not symmetrical. The images projected in such a screen, as shown in FIG. 13 may be watched in their entirety from anywhere to the left of point 11, all the way to infinity. The specular surfaces 3 in this case are also parabolic with axes inclined in a direction parallel to the limiting planes (0 and 30 degrees), passing, each of them through one of the extreme points 5 or 5' and having their foci on the opposite points 5' or 5.

Since the lower parabolic specular surface, in FIG. 12, intersects the extreme tangent at 12, to the right of 7–7', it has to be prolonged, as a flat surface until its intersection with 7–7'. All the light from anywhere within the dihedron 7–10–7' will be reflected back into the same dihedron.

If 2 were convex surfaces, 3 could be obtained by applying Equations 2 and 3 with the proper values of $v$ replaced in each case. If 2 were convex circular cylinders Equations 2 and 3 would simplify into Equations 7 and 8.

Figure 14:
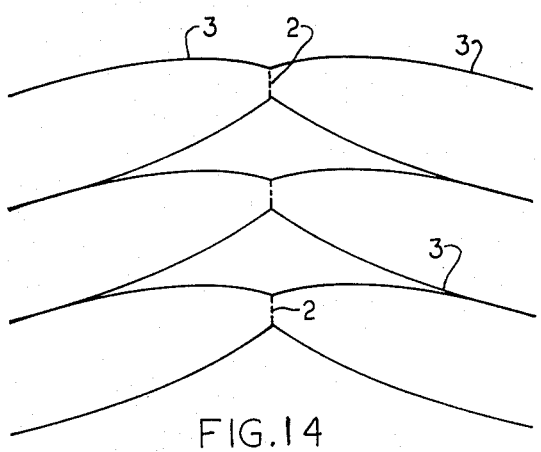
FIG. 14 represents a small section of a rear projection screen within the scope of the present invention.

If the receiving surfaces 2 were made translucent, transparent or were eliminated altogether, and if the specular surfaces 3 were duplicated on the opposite side of 2, as shown in FIG. 14, then the screen would become a rear projection one. A similar type of screen could be applicable to a television receiver.

Figure 15:
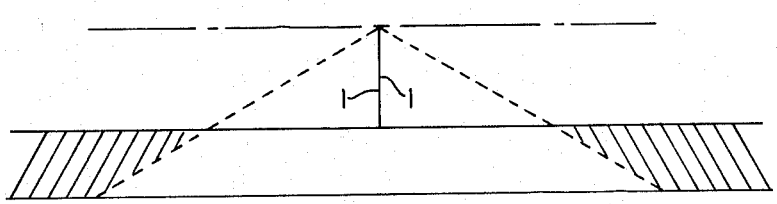
FIG. 15 illustrates the projector and public in the case of a screen such as represented in FIG. 13.

Referring to FIG. 15, composed of elements as shown in FIG. 14, a projector could be located on any of the shaded regions and the spectators could watch the image from the opposite zone. Or, if desired, two projectors could be showing different pictures and two groups of spectators could watch them from opposite sides.

If the receiving surfaces 2 are made of a translucent material having substantial transmittance and reflectance, it would be possible to watch the same projection from both sides with, however, decreased brightness.

As mentioned the surfaces 2 or receiving surfaces, where the light from the projector is concentrated by the specular surfaces 3, may be matte white or they may be of different degrees of specularity. In some cases they may have to be highly specular. This may be required for projections with polarized light (for stereoscopic pictures, for instance). In such cases the shape of the surfaces 2 (FIG. 4) must be designed so as to avoid hot spots i.e. bright virtual images of the objective lens of the projector. Also, to simplify production, it may be very desirable to make the receiving surfaces 2 with the same finish of the specular surfaces 3.

Figure 16:
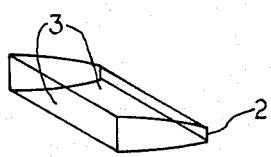
FIG. 16 illustrates an element of screen, in accordance with the present invention, made of a transparent material, such as glass or plastic.

All the elements of a screen may be identical and parallel to each other or they may change in shape and or direction to suit different conditions. Also the elements P instead of being open, as shown, may be closed with a transparent substance to prevent the accumulation of dirt. These elements may be also made of a solid transparent material, in which case due consideration of the refraction occurring must be taken into account. The angles $v$ and $h$ used for the design inside the transparent solid must be reduced. Solid transparent elements will not redirect the light exactly into a dihedron as do the open elements, sideways the vertical angles of spread will increase. This may be an advantage when spectators must be located on the sides very near the screen. FIG. 16 illustrates such a transparent element.

Figure 17:
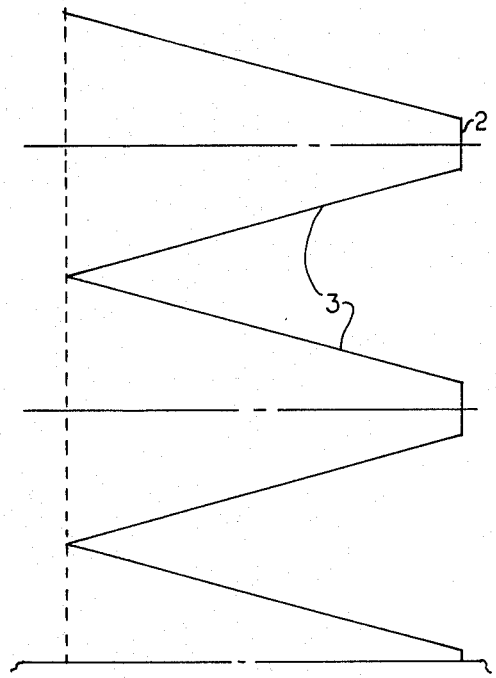
FIG. 17 illustrates another possible construction of an element of screen.

One possible simplification could be the replacement of part or all of the curved specular surfaces 3 by flat ones which, of course, will be simpler to produce. Such an element is shown in FIG. 17.

This type of simplification, though within the scope of the present invention will result in a projected image of lower brightness. Besides, this brightness will change substantially with the viewing angle.

Obviously, a number of structural and detail modifications may be made in the device without departing from the nature and scope of the present invention as defined in the appended claims.

Having now particularly ascertained and described the nature of the present invention and the manner in which the same is to be performed, what we claim is:

1. A projection screen composed of a plurality of elements comprising surfaces intended to receive the light from the projector, which will be called *receiving surfaces* and specularly reflecting surfaces which will be called *specular surfaces,* said specular surfaces intended to concentrate the light from the projector on the receiving surfaces and to reflect the light from such receiving surfaces into the zone where the spectators may be located; the abovementioned receiving surfaces being of any shape to which tangents can be drawn and the abovementioned specular surfaces being of cylindrical shape with generatrices running parallel to the intersections of pairs of limiting planes beyond which no spectators or projectors can be located, and the intersection of each of these cylindrical specular surfaces with a plane of coordinates normal to its generatrices being defined by the following equations:

$$X = x + \frac{E - s - x \sin c + y \cos c}{\sin c - y' \cos c + \sqrt{1 + y'^2}}$$

$$Y = y + \frac{E - s - x \sin c + y \cos c}{\sin c - y' \cos c + \sqrt{1 + y'^2}} y'$$

where $x$ and $y$ are the coordinates of the points of intersection, of tangents to the receiving surfaces parallel to the generatrices of the cylindrical specular surfaces with the plane of coordinates; where $y = f(x)$ defines the abovementioned intersection of the tangents to the receiving surfaces and the plane of coordinates; where $y'$ is the derivative of $y$ with reference to $x$; where $c$ is the angle between the $y$ axis of coordinates and one of the limiting planes beyond which no spectators or projectors can be located; where E is a constant; where X and Y are the coordinates of the abovementioned intersections of each of the cylindrical surfaces called specular surfaces with the plane of coordinates and where $$s = \int_0^x \sqrt{1 + y'^2} dx$$

2. A projection screen composed of a plurality of elements in accordance with claim 1 but in which the tangents to the receiving surfaces mentioned in claim 1 parallel to at least one intersection of a pair of limiting planes beyond which no spectators or projectors can be located, form part of a circular cylinder which intersects a plane of coordinates normal to the abovementioned tangents along a circumference of equation $$y = \sqrt{R^2 - x^2}$$

where $x$ and $y$ are coordinates of points on the abovementioned circumference of radius R; and in which the specular surfaces parallel to the abovementioned circular cylinder are defined by the following equations:

$$X = x + \tfrac{1}{2} \sec^2 \tfrac{1}{2}(t-c)[E + t + \sin(t-c)]R \sin t$$

$$Y = y - \tfrac{1}{2} \sec^2 \tfrac{1}{2}(t-c)[E + t + \sin(t-c)]R \cos t$$

where $$t = \tan^{-1}\left(\frac{y}{x}\right)$$

where E is a constant; where c is the angle between the y axis of coordinates and one of the limiting planes beyond which no spectators or projectors can be located and where X and Y are the coordinates of points of the intersections of the abovementioned specular surfaces with the plane of coordinates.

3. A projection screen in accordance with claim 2 but in which the space between the receiving and specular surfaces composing each element of the screen is filled with a transparent substance different than air.

4. A projection screen composed of a plurality of elements comprising horizontal circular cylindrical receiving surfaces and horizontal cylindrical specular surfaces defined as in claim 2.

5. A projection screen in accordance with claim 4 but including also vertical parabolic surfaces which, when intersected with a horizontal plane originate parabolas with axes parallel to vertical limiting planes beyond which no spectators or projectors can be located.

6. A projection screen in accordance with claim 4 but including also flat vertical specular surfaces.

7. A projection screen composed of a plurality of elements in accordance with claim 1 but in which the tangents to the receiving surfaces mentioned in claim 1, in at least one direction parallel to one intersection of a pair of limiting planes beyond which no spectators or projectors can be located, cut the plane of coordinates, normal to the abovementioned tangents, along a segment of a straight line and in which the specular cylindrical surfaces parallel to the abovementioned tangents cut the same plane of coordinates along parabolas each of which passes through one end of the abovementioned segment, has its focus at the other end on the other parabola and has its axis parallel to one of the abovementioned limiting planes.

8. A projection screen in accordance with claim 7 but in which the space between the receiving and specular surfaces composing each element of the screen is filled with a transparent substance different than air.

9. A projection screen composed of a plurality of elements comprising horizontal cylindrical receiving surfaces and horizontal cylindrical specular surfaces defined as in claim 1.

10. A projection screen in accordance with claim 9 but including also vertical parabolic surfaces which, when intersected with a horizontal plane originate parabolas with axes parallel to vertical limiting planes beyond which no spectators or projectors can be located.

11. A projection screen in accordance with claim 9 but including also flat vertical specular surfaces.

12. A projection screen in accordance with claim 1 but in which the space between the receiving and the specular surfaces composing each element of the screen is filled with a transparent substance different than air.

13. A projection screen composed of a plurality of elements comprising horizontal rectangular receiving surfaces having edges, and horizontal parabolic specular surfaces passing through one of the horizontal edges of the abovementioned rectangular surfaces having their foci on the opposite edges of said rectangular receiving surfaces and having their axes parallel to the limiting planes beyond which no spectators or projectors can be located.

14. A projection screen in accordance with claim 13 but including also vertical parabolic surfaces which, when intersected with a horizontal plane originate parabolas with axes parallel to vertical limiting planes.

15. A projection screen in accordance with claim 13 but including also flat vertical specular surfaces.

16. A projection screen composed of a plurality of elements comprising receiving surfaces of revolution with axes coincident with the axes of limiting cones, beyond which no spectators or projectors can be located, and with specular surfaces also of revolution defined by having their axes coincident with the axes of the receiving surfaces and with the adopted y axis of coordinates and by having their shapes determined by the equations given in claim 1 where c is substituted by half of the aperture of the limiting cones.

17. A projection screen composed of a plurality of elements comprising receiving surfaces which are of spherical shape and specular surfaces determined by means of the equations given in claim 2.

18. A projection screen composed of a plurality of elements comprising receiving surfaces which are flat circular discs and specular surfaces which are surfaces of revolution generated by the rotation of parabolas with foci on the opposite edges of said flat circular discs.

References Cited by the Examiner

UNITED STATES PATENTS

| | | | |
|---|---|---|---|
| 1,498,433 | 6/1924 | Bouin | 88—28.9 |
| 1,535,985 | 4/1925 | Clark | 88—28.9 |
| 2,351,033 | 6/1944 | Gabor. | |
| 2,738,706 | 3/1956 | Thompson | 88—28.93 |
| 3,180,214 | 4/1965 | Fox | 88—28.9 |

JULIA E. COINER, *Primary Examiner.*